United States Patent
Huang (10) Patent No.: US 10,488,664 B2
(45) Date of Patent: Nov. 26, 2019

(54) HEAD MOUNTED DISPLAY

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 249 days.

(21) Appl. No.: 15/642,357

(22) Filed: Jul. 6, 2017

(65) Prior Publication Data
US 2018/0231780 A1    Aug. 16, 2018

(30) Foreign Application Priority Data

Feb. 16, 2017    (TW) .............................. 106105015 A (51) Int. Cl.
*G02B 27/01*    (2006.01)
*F21V 8/00*    (2006.01)
(Continued)

(52) U.S. Cl.
CPC ..... *G02B 27/0172* (2013.01); *G02B 27/0176* (2013.01); *H04N 13/341* (2018.05);
(Continued)

(58) Field of Classification Search
CPC ............ G02B 27/0172; G02B 27/0176; G02B 2027/0136; G02B 27/2264;
(Continued)

(56) References Cited

U.S. PATENT DOCUMENTS 6,271,808 B1 *    8/2001    Corbin ............... G02B 27/0172
345/7
6,795,042 B1 *    9/2004    Nagata ............... G02B 27/0172
345/15
(Continued)

FOREIGN PATENT DOCUMENTS

CN    101285936 A    10/2008
CN    106226902 A    12/2016
(Continued)

OTHER PUBLICATIONS

Yuchang Wang, Junejei Huang, 3D head mount display with single panel, Delta Electronics, Inc. (Taiwan) Published in SPIE Proceedings vol. 9192, Current Developments in Lens Design and Optical Engineering XV, Sep. 2014.

*Primary Examiner* — Susan E. Hodges
(74) *Attorney, Agent, or Firm* — CKC & Partners Co., LLC (57) ABSTRACT

A head mounted display includes first and second light sources, an image output module and a light guide plate. The first light source is configured to emit a first light. The second light source is configured to emit a second light. The image output module is configured to receive the first light and the second light, and respectively generate first and second image lights with the relative image information. The light guide plate includes first and second light-output portions, and the first light-output portion and the second light-output portion are separated from each other by at least one distance along a first direction. The light guide plate is configured to guide the first image light propagating in the guide plate into the first light-output portion and to guide the second image light propagating in the light guide plate into the second light-output portion.

8 Claims, 3 Drawing Sheets

(51) Int. Cl.
*H04N 13/00* (2018.01)
*H04N 13/341* (2018.01)
*H04N 13/344* (2018.01)
*H04N 13/398* (2018.01)

(52) U.S. Cl.
CPC ......... *H04N 13/344* (2018.05); *H04N 13/398* (2018.05); *G02B 2027/015* (2013.01); *G02B 2027/0125* (2013.01); *G02B 2027/0134* (2013.01)

(58) Field of Classification Search
CPC .... G02B 2027/0125; G02B 2027/0134; G02B 2027/015; H04N 13/398; H04N 13/344; H04N 13/341; H04N 2213/001
USPC ......................................................... 348/53
See application file for complete search history.

(56) References Cited

U.S. PATENT DOCUMENTS

| | | | |
|---|---|---|---|
| 6,972,735 | B2 | 12/2005 | Hebert |
| 7,206,135 | B2* | 4/2007 | Yamazaki .......... G02B 17/0848 345/8 |
| 9,488,757 | B2* | 11/2016 | Mukawa ................. G02B 3/12 |
| 2002/0015114 | A1* | 2/2002 | Okuyama .......... G02B 27/0172 349/5 |
| 2004/0113867 | A1 | 6/2004 | Tomine et al. |
| 2009/0027772 | A1 | 1/2009 | Robinson |
| 2010/0165300 | A1* | 7/2010 | Shimaoka ............ G03B 21/208 353/33 |

FOREIGN PATENT DOCUMENTS

| | | |
|---|---|---|
| TW | 201518773 A | 5/2015 |
| TW | 201710741 A | 3/2017 |

* cited by examiner

HEAD MOUNTED DISPLAY

RELATED APPLICATIONS

This application claims priority to Taiwan Application Serial Number 106105015, filed Feb. 16, 2017, which is herein incorporated by reference.

BACKGROUND

Technical Field

The present disclosure relates to a head mounted display. More particularly, the present disclosure relates to a stereo head mounted display.

Description of Related Art

In recent years, with the increasing development of virtual reality technology, an optical product which can show a stereoscopic image has become a focal point in the consumer market. Conventionally, a head mounted display can respectively provide different images to the eyes of an observer, and the eyes of the observer can respectively receive different image information, so that the observer can perceive a stereoscopic image by exploiting the binocular parallax of typical human sight. However, a conventional head mounted display has a complex structure, a huge size and a heavy weight, which may affect wearing convenience and comfort of the observer.

SUMMARY

The disclosure provides a head mounted display, which can provide a stereo display and reduce a size of the head mounted display, so as to improve convenience and comfort of wearing the head mounted display.

In accordance with some embodiments of the present disclosure, a head mounted display includes a first light source, a second light source, an image output module and a light guide plate. The first light source is configured to emit a first light. The second light source is configured to emit a second light. The image output module is configured to receive the first light and the second light, and respectively generate a first image light and a second image light with the relative image information. The light guide plate includes a first light-output portion and a second light-output portion, and the first light-output portion and the second light-output portion are separated from each other by at least one distance along a first direction, and the first direction is an arrangement direction of the first light source and the second light source. The light guide plate is configured to guide the first image light propagating in the guide plate into the first light-output portion and to guide the second image light propagating in the light guide plate into the second light-output portion.

In embodiments of the present disclosure, by such a configuration of the image output module and the light guide plate, the head mounted display can provide the first image light and the second image light. The first image light and the second image light can be respectively guided into the first light-output portion and the second light-output portion through the light guide plate. Since the first light-output portion and the second light-output portion are spaced apart from each other, eyes (right and left eyes) of an observer can respectively receive the first image light from the first light-output portion and the second image light from the second light-output portion, so that the observer can perceive a stereoscopic image. Moreover, a size of the light guide plate can be designed to meet different requirements; so as to reduce the size of the head mounted display.

It is to be understood that both the foregoing general description and the following detailed description are by examples, and are intended to provide further explanation of the invention as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Further, the spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Furthermore, the term "device A is optically coupled to device B" not only indicates that a light from or through the device A can directly propagate into the device B, but also indicates that other optical devices can be interposed between the device A and the device B as long as a light from or through the device A can propagate into the device B. Similarly, the term "device A is optically coupled between device B and device C" indicates that other optical devices can be interposed among the device A, device B and the device C as long as a light can propagate through the device A, device B and device C.

Figure 1:
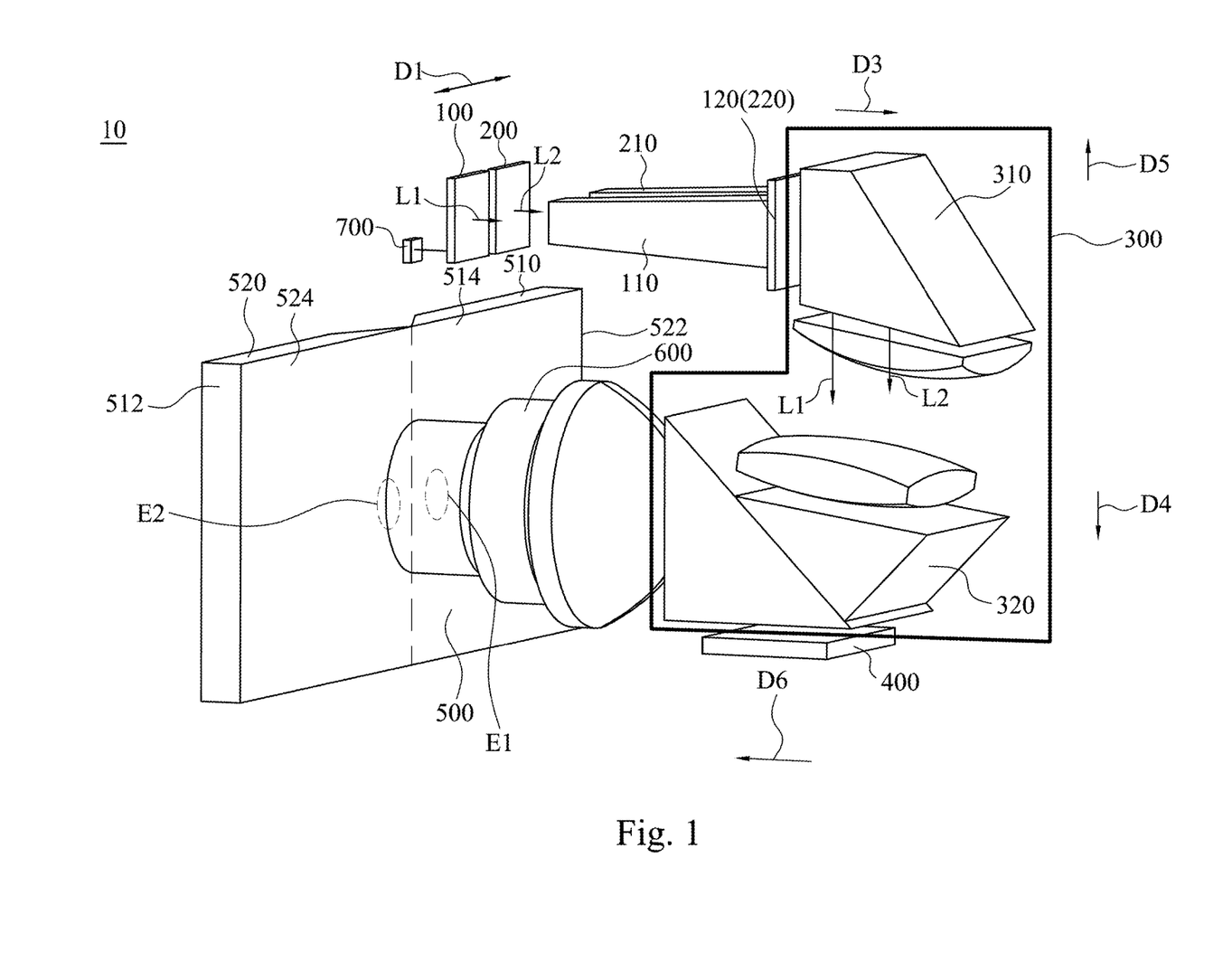
FIG. 1 is a perspective view of a head mounted display in accordance with some embodiments of the present disclosure.

FIG. 1 is a perspective view of a head mounted display in accordance with some embodiments of the present disclosure. As shown in FIG. 1, in some embodiments, the head mounted display 10 includes a first light source 100, a second light source 200, a light reversely turning module 300, an image output module 400 and a light guide plate 500. The first light source 100 is configured to emit a first light L1. The second light source 200 is configured to emit a second light L2. The light reversely turning module 300 is optically coupled between the first light source 100 and the image output module 400, and optically coupled between the second light source 200 and the image output module 400. The light reversely turning module 300 is configured to change a propagating direction of the first light L1, and change a propagating direction of the second light L2. The image output module 400 is configured to receive the first light L1 and the second light L2, and to generate a first image light I1 and a second image light I2 with respective image information. The light guide plate 500 may guide the first image light I1 and the second image light I2 respectively into right and left eyes of an observer. More particularly, the light guide plate 500 include a first light-output portion A1 and a second light-output portion A2 separated from each other, the first light-output portion A1 and the second light-output portion A2 are spaced apart from each other by at least one distance along a first direction D1, and the first direction D1 is an arrangement direction of the first light source 100 and the second light source 200. In other words, the first light-output portion A1 and the second light-output potion A2 are located at different positions of the light guide plate 500 and spatially separated from each other. The light guide plate 500 is configured to guide the first image light I1 propagating in the light guide plate 500 to the first light-output portion A1 and guide the second image light I2 propagating in the light guide plate 500 to the second light-output portion A2. Then, the first image light I1 may leave the light guide plate 500 through the first light-output portion A1 and propagate to the right eye of the observer, and the second image light I2 may leave the light guide plate 500 through the second light-output portion A2 and propagate to the left eye of the observer. As a result, the head mounted display 10 can respectively provide eyes of an observer with different image information (that is, the first image light I1 and the second image light I2), and then the different image information received by the eyes of the observer may be combined in a brain of the observer, so that the observer may perceive a stereoscopic image.

Figure 2:
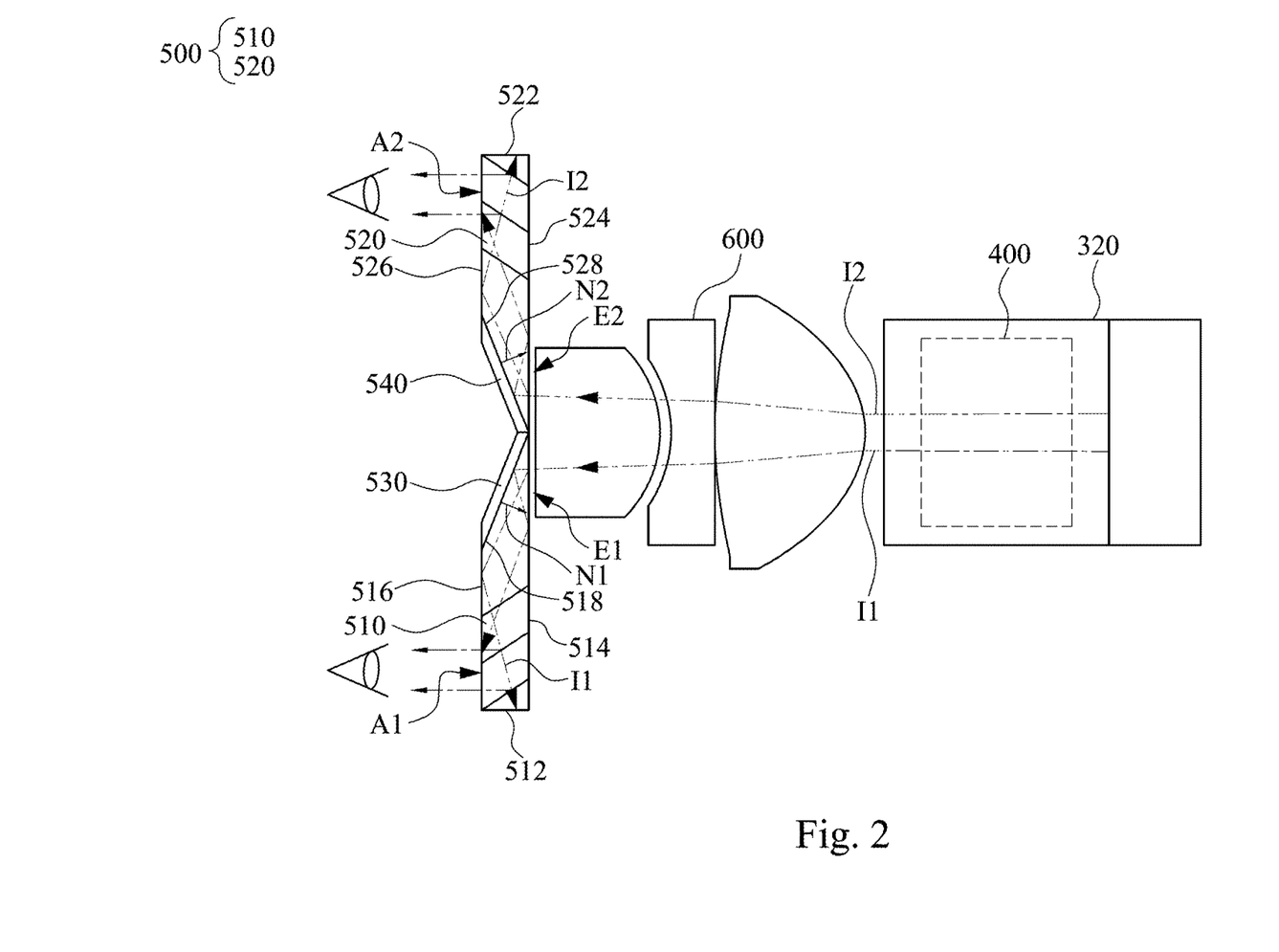
FIG. 2 is a top view of a head mounted display in accordance with some embodiments of the present disclosure.

Reference is made to FIG. 1 and FIG. 2. FIG. 2 is a top view of a head mounted display in accordance with some embodiments of the present disclosure. In some embodiments, the light guide plate 500 includes a first light guide sub-plate 510 and a second light guide sub-plate 520. The first light guide sub-plate 510 includes a first lateral surface 512 and a first light-input surface 514 intersecting each other, and an area of the first light-input surface 514 is larger than that of the first lateral surface 512. The first light-input surface 514 has a first light-input portion E1, the first light-input portion E1 is located within a partial region of the first light-input surface 514, and the first light-input portion E1 is farther away the first lateral surface 512 than the first light-output portion A1 being. In other words, as shown in FIG. 2, the first light-input portion E1 is between the first light-output portion A1 and the second light-output portion A2. That is, the first light-output portion A1 and the second light-output portion A2 are respectively located on opposite sides of the first light-input portion E1. The first image light I1 propagates into the first light guide sub-plate 510 through the first light-input portion E1 of the first light-input surface 514. Similarly, in some embodiments, the second light guide sub-plate 520 includes a second lateral surface 522 and a second light-input surface 524 intersecting each other, and an area of the second light-input surface 524 is larger than that of the second lateral surface 522. The second light-input surface 524 has a second light-input portion E2, the second light-input portion E2 is located within a partial region of the second light-input surface 524, and the second light-input portion E2 is farther away the second lateral surface 522 than the second light-output portion A2 being. In other words, as shown in FIG. 2, the second light-input portion E2 is between the first light-output portion A1 and the second light-output portion A2. That is, the first light-output portion A1 and the second light-output portion A2 are respectively located on opposite sides of the second light-input portion E2. The second image light I2 propagates into the second light guide sub-plate 520 through the second light-input portion E2 of the second light-input surface 524.

In some embodiments, for example, the first light guide sub-plate 510 and the second light guide sub-plate 520 may be, but is not limited to be, transflective light guides, holographic optical element (HOE), combinations thereof, or other suitable optical devices. In some embodiments, the first light guide sub-plate 510 is monolithically connected to the second light guide sub-plate 520, and the first light-input surface 514 and the second light-input surface 524 may be coplanar. Alternatively, the first light guide sub-plate 510 can be connected to the second light guide sub-plate 520 by an adhesive. In other embodiments, the first light guide sub-plate 510 is not connected to the second light guide sub-plate 520. Instead, the first light guide sub-plate 510 and the second light guide sub-plate 520 are separated from each other by at least one distance.

Reference is made to FIG. 2. In some embodiments, the first light guide sub-plate 510 has a first light-output surface 516 opposite to the first light-input surface 514, and the first light-output surface 516 is farther away the light reversely turning module 300 than the first light-input surface 514 being. The first light-output portion A1 is located within a partial region of the first light-output surface 516, and the first light-output portion A1 is closer to the first lateral surface 512 than the first light-input portion E1 being. When the first image light I1 arrives at the first light-input portion E1 of the first light-input surface 514, the first image light I1 may propagate into and be transmitted within the first light guide sub-plate 510. The first light guide sub-plate 510 is designed such that the first image light I1 propagates from the first light-input portion E1 towards the first light-output portion A1 in the first light guide sub-plate 510. Then, the first image light I1 may leave the first light guide sub-plate 510 through the first light-output portion A1 of the first light-output surface 516 and be guided into the right eye of the observer.

Similarly, in some embodiments, the second light guide sub-plate 520 has a second light-output surface 526 opposite to the second light-input surface 524, and the second light-output surface 526 is farther away the light reversely turning module 300 than the second light-input surface 524 being. The second light-output portion A2 is located within a local region of the second light-output surface 526, and the second light-output portion A2 is closer to the second lateral surface 522 than the second light-input portion E2 being. When the second image light I2 arrives at the second light-input portion E2 of the second light-input surface 524, the second image light I2 may propagate into and be transmitted within the second light guide sub-plate 520. The second light guide sub-plate 520 is designed such that the second image light I2 propagates from the second light-input portion E2 towards the second light-output portion A2 in the second light guide sub-plate 520. Then, the second image light I2 may leave the second light guide sub-plate 520 through the second light-output portion A2 of the second light-output surface 526 and be guided into the left eye of the observer. As a result, by such a configuration of the first light guide sub-plate 510 and the second light guide sub-plate 520, the first image light I1 and the second image light I2 may be precisely transmitted into the right and left eyes of the observer respectively.

In some embodiments, as shown in FIG. 2, the head mounted display 10 further includes a first reflection unit 530. The first reflection unit 530 abuts the first light guide sub-plate 510. The first light-input portion E1 of the light guide plate 500 is optically coupled to the first reflection unit 530, and a vertical distance between the first reflection unit 530 and the first light-input portion E1 of the light guide plate 500 increases along a direction from the first light-input portion E1 to the first light-output portion A1. In other words, the first reflection unit 530 has a normal line N1 towards the bottom right of the figure. As a result, according to a law of reflection, an incident light and a reflected light are respectively on opposite sides of the normal line. Therefore, when the first image light I1 propagates from the first light-input portion E1 to arrive at the first reflection unit 530, the first image light I1 may be redirected by the first reflection unit 530, such that the first image light I1 may be transmitted towards the first light-output portion A1 in the first light guide sub-plate 510.

Similarly, in some embodiments, as shown in FIG. 2, the head mounted display 10 further includes a second reflection unit 540. The second reflection unit 540 abuts the second light guide sub-plate 520. The second light-input portion E2 of the light guide plate 500 is optically coupled to the second reflection unit 540, and a vertical distance between the second reflection unit 540 and the second light-input portion E2 of the light guide plate 500 increases along a direction from the second light-input portion E2 to the second light-output portion A2. In other words, the second reflection unit 540 has a normal line N2 towards the top right of the figure. As a result, according to a law of reflection, an incident light and a reflected light are respectively on opposite sides of the normal line. Therefore, when the second image light I2 propagates from the second light-input portion E2 to arrive at the second reflection unit 540, the second image light I2 may be redirected by the second reflection unit 540, such that the second image light I2 may be transmitted towards the second light-output portion A2 in the second light guide sub-plate 520.

More particularly, in some embodiments, the first light guide sub-plate 510 includes a first light guide surface 518. The first light guide surface 518 is closer to the second light guide sub-plate 520 than the first lateral surface 512 being. The first reflection unit 530 abuts the first light guide surface 518, and the first reflection unit 530 is configured to change a propagating direction of the first image light I1. State differently, by the first reflection unit 530, the first image light I1 may be redirected from the first light guide surface 518 of the first light guide sub-plate 510 to the first lateral surface 512. Similarly, the second light guide sub-plate 520 includes a second light guide surface 528. The second light guide surface 528 is closer to the first light guide sub-plate 510 than the second lateral surface 522 being. The second reflection unit 540 abuts the second light guide surface 528, and the second reflection unit 540 is configured to change a propagating direction of the second image light I2. State differently, by the second reflection unit 540, the second image light I2 may be redirected from the second light guide surface 528 of the second light guide sub-plate 520 to the second lateral surface 522. Since the first image light I1 and the second image light I2 may respectively be reflected by the first reflection unit 530 and the second reflection unit 540, the propagating direction of the first image light I1 may be different from that of the second image light I2. Therefore, the first image light I1 and the second image light I2 transmitted in the light guide plate 500 may not interfere each other, and hence the first image light I1 may be precisely transmitted into the right eye of the observer, and the second image light I2 may be precisely transmitted into the left eye of the observer.

In some embodiments, the first reflection unit 530 may be connected to the first light-input surface 514, and an angle formed by the first reflection unit 530 and the first light-input portion E1 of the first light-input surface 514 is an acute angle. Specifically, the first reflection unit 530 and the first light-input surface 514 form an angle θ1 therebetween, and the angle θ1 is less than 45 degrees. Therefore, when the first light-input surface 514 of the first light guide sub-plate 510 is a vertical surface as shown in FIG. 2, the normal line N1 of the first reflection unit 530 is towards the bottom right of FIG. 2. As a result, when the first image light I1 arrives at the first reflection unit 530 through the first light-input surface 514, the first image light I1 may be redirected by the first reflection unit 530 and propagate towards the first light-output portion A1. Similarly, the second reflection unit 540 may be connected to the second light-input surface 524, and an angle formed by the second reflection unit 540 and the second light-input portion E2 of the second light-input surface 524 is an acute angle. Specifically, the second reflection unit 540 and the second light-input surface 524 form an angle θ2 therebetween, and the angle θ2 is less than 45 degrees. Therefore, when the second light-input surface 524 of the second light guide sub-plate 520 is a vertical surface as shown in FIG. 2, the normal line N2 of the second reflection unit 540 is towards the top right of FIG. 2. As a result, when the second image light I2 arrives at the second reflection unit 540 through the second light-input surface 524, the second image light I2 may be redirected by the second reflection unit 540 and propagate towards the second light-output portion A2.

In some embodiments, the first reflection unit 530 and the second reflection unit 540 may be, but are not limited to be, reflective mirrors. In other embodiments, the first reflection unit 530 and the second reflection unit 540 may be, but are not limited to be, thin films of gold, silver, or other materials with high reflectivity.

Reference is made to FIG. 1 and FIG. 2. In some embodiments, the head mounted display 10 includes an eyepiece module 600. The eyepiece module 600 is optically coupled between the light reversely turning module 300 and the light guide plate 500. The first image light I1 through the eyepiece module 600 may propagate into the first light-input portion E1 of the light guide plate 500, and the second image light I2 through the eyepiece module 600 may propagate into the second light-input portion E2 of the light guide plate 500. More particularly, exits of tapered rods 110 and 210 are respectively imaged to the first light-input portion E1 and the second light-input portion E2, and the first light-input portion E1 does not overlap with the second light-input portion E2. Since the first light-input portion E1 does not overlap with the second light-input portion E2, the first image light I1 through the eyepiece module 600 may be precisely transmitted into the first light guide sub-plate 510, rather than being transmitted into the second light guide sub-plate 520. Similarly, the second image light I2 through the eyepiece module 600 may be precisely transmitted into the second light guide sub-plate 520, rather than being transmitted into the first light guide sub-plate 510.

In some embodiments, for example, the first light-input portion E1 of the first light guide sub-plate 510 and the second light-input portion E2 of the second light guide sub-plate 520 are spaced apart from each other by at least one distance, so that the first image light I1 and the second image light I2 can be precisely transmitted into the first light guide sub-plate 510 and the second light guide sub-plate 520 respectively. In other embodiments, the first light-input portion E1 of the first light guide sub-plate 510 and the second light-input portion E2 of the second light guide sub-plate 520 are connected to each other, and the first light-input portion E1 does not overlap with the second light-input portion E2, as examples.

Figure 3:
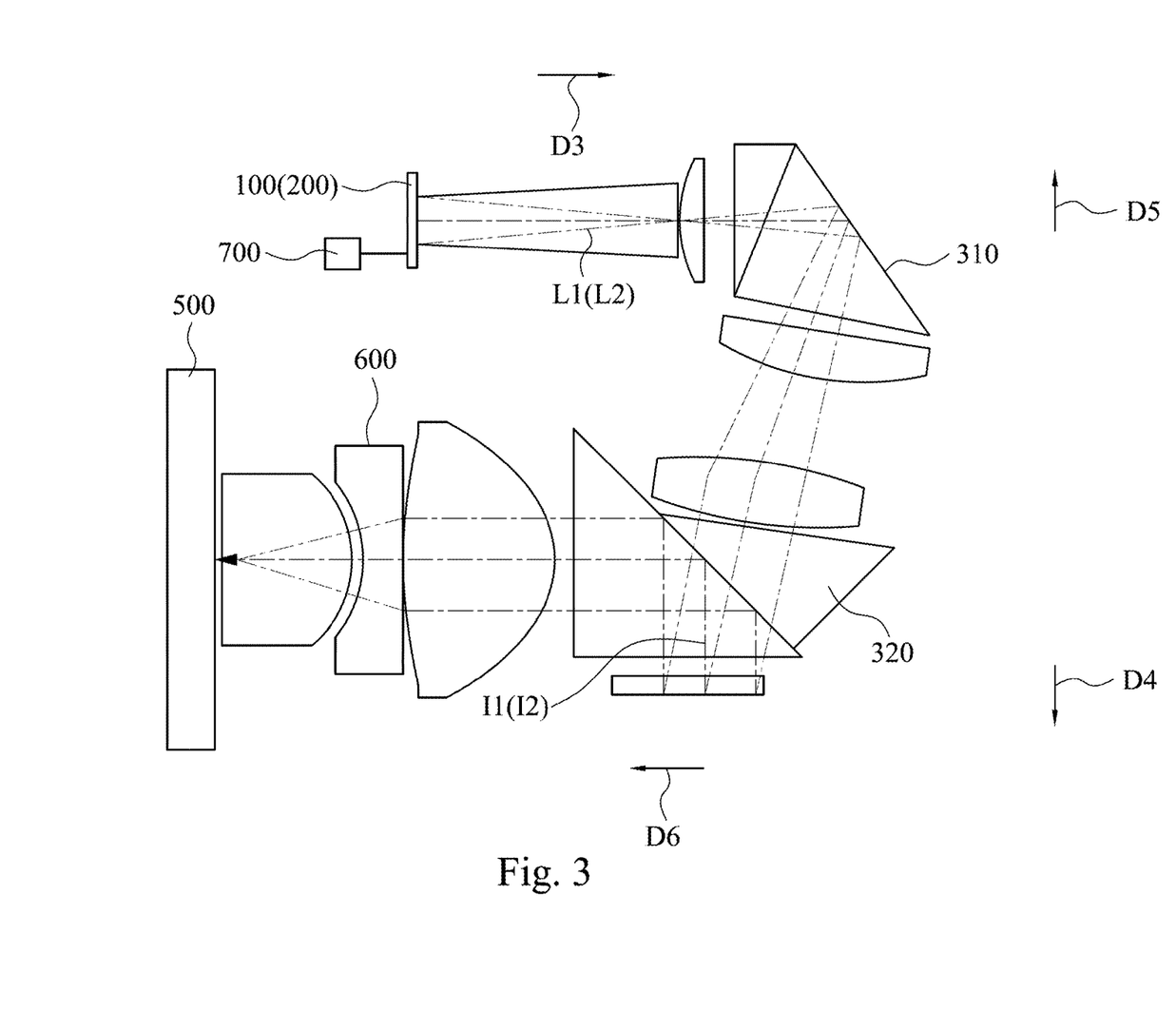
FIG. 3 is a top view of a head mounted display in accordance with some embodiments of the present disclosure.

Reference is made to FIG. 1 and FIG. 3. FIG. 3 is a top view of a head mounted display in accordance with some embodiments of the present disclosure. The light reversely turning module 300 includes a first light turning unit 310 and a second light turning unit 320. The first light turning unit 310 is configured to redirect the first light L1 from the first light source 100 to the second light turning unit 320, and to redirect the second light L2 from the second light source 200 to the second light turning unit 320. The second light turning unit 320 is configured to redirect the first light L1 and the second light L2 from the first light turning unit 310 to the image output module 400. In some embodiments, for examples, an irradiation surface of the first light source 100 faces towards a direction D3 (that is, a direction from left to right of FIG. 3). When the first light L1 irradiated from the first light source 100 propagates along the direction D3 and arrives at the first light turning unit 310 of the light reversely turning module 300, the first light L1 may be reflected by the first light turning unit 310 and propagate towards the second light turning unit 320 along a direction D4 (that is, a direction from top to bottom of FIG. 3). Then, the first light L1 may pass through the second light turning unit 320 and arrive at the image output module 400, and the image output module 400 may convert the first light L1 as the first image light I1 with image information. The first image light I1 may propagate along an arrangement direction D5 of the second light turning unit 320 and the first light turning unit 310. When the first image light I1 arrives at the second light turning unit 320, the first image light I1 may be redirected by the second light turning unit 320 and propagate towards the light guide plate 500 along a direction D6 (that is, a direction from right to left of FIG. 6).

Similarly, in some embodiments, an irradiation surface of the second light source 200 faces towards the direction D3 (that is, the direction from left to right of FIG. 3). When the second light L2 irradiated from the second light source 200 propagates along the direction D3 and arrives at the first light turning unit 310 of the light reversely turning module 300, the second light L2 may be reflected by the first light turning unit 310 and propagate towards the second light turning unit 320 along the direction D4 (that is, the direction from top to bottom of FIG. 3). Then, the second light L2 may pass through the second light turning unit 320 and arrive at the image output module 400, and the image output module 400 may convert the second light L2 as the second image light I2 with image information. The second image light I2 may propagate along the arrangement direction D5 of the second light turning unit 320 and the first light turning unit 310. When the second image light I2 arrives at the second light turning unit 320, the second image light I2 may be redirected by the second light turning unit 320 and propagate towards the light guide plate 500 along the direction D6 (that is, a direction from right to left of FIG. 6).

As a result, by the first light turning unit 310 and the second light turning unit 320, the first light L1 from the first light source 100 and the second light L2 from the second light source 200 arriving at the image output module 400 may be redirected at least two times, so the image output module 400 can be disposed on the level height being different from the level height where the first light source 100 and the second light source 200 are disposed (for example, the image output module 400 is disposed on the bottom right of FIG. 1 and FIG. 3). In other words, the level height where the first light source 100 is disposed may be different from that of the image output module 400, and the level height where the second light source 200 is disposed may be different from that of the image output module 400, thereby minimizing a horizontal area of the head mounted display 10. In some embodiments, the level height where the first light source 100 is disposed may be substantially the same as that of the second light source 200, as examples.

In some embodiments, for example, the first light turning unit 310 may be, but is not limited to be, a totally internal reflection prism, a reflective mirror, such as a reflective mirror with aluminum coating, a reflective mirror with metal film, or a reflective mirror with a high reflectivity material, so as to redirect the first light L1 and the second light L2 to the second light turning unit 320 more effectively. In some embodiments, the second light turning unit 320 may be, but is not limited to be, a totally internal reflection prism, so as to separate the first light L1 and the first image light I1 more effectively, and to separate the second light L2 and the second image light I2 more effectively.

In some embodiments, the image output module 400 is a digital micro-mirror device (DMD) configured to reflect he first light L1 from the second light turning unit 320 as the first image light I1 with the corresponding image information, and to reflect the second light L2 from the second light turning unit 320 as the second image light I2 with the corresponding image information. More particularly, the digital micro-mirror device may include a plurality of micro reflected mirrors, and the reflected direction of the light received by each micro reflected mirror can be controlled. Each micro reflected mirror represents an image pixel, and each micro reflected mirror can be driven by a control device, so the micro reflected mirror can be rotated between two angles corresponding to the on/off states.

For examples, when the first light L1 propagates into the digital micro-mirror device, a first group of the micro reflected mirrors may receive the first light L1 and then the first light L1 may be reflected as the first image light I1 with the corresponding image information. The first image light I1 may be redirected by the second light turning unit 320 (such as the totally internal reflection (TIR) prism) and propagate towards the light guide plate 500 along the direction D6. Similarly, when the second light L2 propagates into the digital micro-mirror device, a second group of the micro reflected mirrors may receive the second light L2 and then the second light L2 may be reflected as the second image light I2 with the corresponding image information. The second image light I2 may be redirected by the second light turning unit 320 and propagate towards the light guide plate 500 along the direction D6. It is noted that the first group of the micro reflected mirrors may be different from the second group of the micro reflected mirrors, so the digital micro-mirror device may generate the first image light I1 and the second image light I2 with different angles in a manner of reflection. In other words, when the image output module 400 is the digital micro-mirror device, it may separate the optical paths of the first image light I1 and the second image light I2 more effectively, so as to avoid the first image light I1 and the second image light I2 from interfering with each other. Therefore, the first image light I1 and the second image light I2 can be transmitted into the first light guide sub-plate 510 and the second light guide sub-plate 520 of the light guide plate 500 more precisely. For example, the image output module 400 may be, but is not limited to be, a tilt and roll pixel (TRP) digital micro-mirror device.

In some embodiments, the head mounted display 10 includes a light timing control unit 700. The first light source 100 and the second light source 200 are connected to the light timing control unit 700, and the light timing control unit 700 is configured to control the first light source 100 and the second light source 200 to emit light in a time sequence. In other words, the light timing control unit 700 is configured to control the light emitting time of the first light source 100 different from that of the second light source 200. That is, the first light source 100 and the second light source 200 emit light alternatively. In some embodiments, for example, at a first time point, the first light source 100 emits the first light L1, the first light L1 is redirected to the image output module 400 by the light reversely turning module 300 for generating the first image light I1, and the first image light I1 is guided into the right eye of the observer by the first light guide sub-plate 510 of the light guide plate 500. At a second time point, the second light source 200 emits the second light L2, the second light L2 is redirected to the image output module 400 by the light reversely turning module 300 for generating the second image light I2, and the second image light I2 is guided into the left eye of the observer by the second light guide sub-plate 520 of the light guide plate 500. As a result, by rapidly switching the first light source 100 and the second light source 200 in the time sequence, the corresponding first image light I1 and the second image light I2 may be respectively imaged to the right and left eye of the observer in the time sequence, so as to achieve a stereoscopic display of the head mounted display 10. In other words, the head mounted display 10 of the present disclosure uses a time-multiplex way to switch the first light source 100 and the second light source 200 in the time sequence, so the head mounted display 10 can provide a stereoscopic image.

In some embodiments, the image output module 400 provides a plurality of reflected patterns in the time sequence, and switching between the first light source 100 and the second light source 200 is substantially synchronized with switching between the reflected patterns. More particularly, in some embodiments, the reflected patterns can be classified as a first group of reflected patterns and a second group of reflected patterns, and the first group of reflected patterns and the second group of reflected patterns are switched in the time sequence. That is, the image output module 400 alternately provides the first group of reflected patterns and the second group of reflected patterns according to the time sequence. For example, at the first time point, the first light source 100 emits the first light L1 to the image output module 400, and the image output module 400 provides the first group of reflected patterns in substantial synchronization, so the image output module 400 receives the first light L1 and generates the first image light I1 with the image information of the first group of reflected patterns. Then, at the second time point, the second light source 200 emits the second light L2 to the image output module 400, and the image output module 400 provides the second group of reflected patterns in substantial synchronization, so the image output module 400 receives the second light L2 and generates the second image light I2 with the image information of the second group of reflected patterns. In other words, at a first time t1, the first light source 100 may be controlled to emit light, and the second light source 200 may be controlled to not emit light, and the image output module 400 may be controlled to provide the first group of reflected patterns. Then, at a second time t2, the first light source 100 may be controlled to not emit light, and the second light source 200 may be controlled to emit light, and the image output module 400 may be controlled to provide the second group of reflected patterns. Accordingly, the first light L1 generated by the first light source 100 is substantially synchronized with the first group of reflected patterns generated by the image output module 400, so as to generate the first image light I1 with the correct image information, which may benefit to image the first image light I1 to the right eye of the observer. Similarly, the second light L2 generated by the second light source 200 is substantially synchronized with the second group of reflected patterns generated by the image output module 400, so as to generate the second image light I2 with the correct image information, which may benefit to image the second image light I2 to the left eye of the observer.

In some embodiments, the first light source 100 may include a solid-state light source array. Similarly, the second light source 200 may include a solid-state light source array. The solid-state light source arrays may include at least one solid-state light source, such as a red light source, a green light source or a blue light source, and it may be a light emitting diode or an organic light emitting diode, but it is not limited. It should be noted that, the first light L1 emitted by the solid-state light source array of the first light source 100 is substantially a telecentric light, that is, a divergence angle of the first light L1 is close to zero. Therefore, after the image output module 400 receives the first light L1, the image output module 400 may generate the substantially telecentric first image light I1, so the first image light I1 may be precisely guided into the right eye of the observer through the light guide plate 500, so as to avoid the first image light I1 from shifting to the left eye of the observer. Similarly, the second light L2 emitted by the solid-state light source array of the second light source 200 is substantially a telecentric light, that is, a divergence angle of the second light L2 is close to zero. Therefore, after the image output module 400 receives the second light L2, the image output module 400 may generate the substantially telecentric second image light I2, so the second image light I2 may be precisely guided into the left eye of the observer through the light guide plate 500, so as to avoid the second image light I2 from shifting to the right eye of the observer. Furthermore, in some embodiments, as shown in FIG. 1, the first light source 100 and the second light source 200 may also include tapered rods 110 and 210, and may include ball lenses 120 and 220 configured to adjust the intensity and the uniformity of lights, thereby improving an image quality of the head mounted display 10.

In some embodiments, the first and second light guide sub-plates 510 and 520 in the head mounted display 10 are light-weight so as to improve comfort of wearing the head mounted display 10. For example, in some embodiments, since the head mounted display 10 is small-size and light-weight, the head mounted display 10 can be assembled with a support base or frame (not shown), which can accommodate the head mounted display 10. The support base or frame has a clamp clamping a visor of a hat. As a result, the observer can see the stereoscopic image displayed by the head mounted display 10 by wearing the hat with the head mounted display 10, without direct contact with the head mounted display 10. Moreover, when the observer wears typical eyeglasses, the eyeglasses will not affect operation of the head mounted display 10, so that convenience and comfort of wearing the head mounted display 10 can be improved.

In the foregoing embodiments, by sequential switching between the first and second light sources and by the configuration of the image output module 400 and the light guide plate, the head mounted display can provide the first and second image lights in a time sequence. The first and second image lights can be respectively guided to the first and second light-output portions by the light guide plate. Because the first and second light-output portions are separated, left and right eyes of the observer can respectively receive the first and second image lights from the first and second light-output portions, so that a stereoscopic image can be observed. Moreover, size of the light guide plate can be adjusted based on various demands to benefit shrinkage of the head mounted display.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A head mounted display, comprising:
    a first light source configured to emit a first light;
    a second light source configured to emit a second light;
    a digital micro-mirror device configured to receive the first light and the second light, and to respectively generate a first image light and a second image light with corresponding image information;
    a light guide plate comprising a first light-output portion and a second light-output portion, wherein the first light-output portion and the second light-output portion are spaced apart from each other by at least one distance along a first direction, the first direction is an arrangement direction of the first light source and the second light source, and the light guide plate is configured to guide the first image light propagating in the light guide plate into the first light-output portion and to guide the second image light propagating in the light guide plate into the second light-output portion;
    a first reflection prism optically coupled between the first light source and the digital micro-mirror device, and optically coupled between the second light source and the digital micro-mirror device, wherein a level height where the first light source is located is equal to a level height where the second light source is located, and a level height where the digital micro-mirror device is located is different from the level height where the first light source is located;
    a second reflection prism optically coupled between the digital micro-mirror device and the light guide plate, wherein the first image light and the second image light arriving at the second reflection prism are redirected towards the light guide plate; and
    a first tapered rod group disposed between the first light source and the first reflection prism and a second tapered rod group disposed between the second light source and the first reflection prism, wherein when the first light and the second light are emitted, the first light and the second light arrive at the first reflection prism through optical channels defined by the tapered rod groups.

2. The head mounted display of claim 1, further comprising:
    a first reflection unit, wherein the light guide plate comprises a first light-input portion optically coupled to the first reflection unit, the first light-output portion and the second light-output portion are respectively disposed on opposite sides of the first light-input portion, and a distance between the first reflection unit and the first light-input portion increases along the first direction from the first light-input portion towards the first light-output portion.

3. The head mounted display of claim 2, wherein an angle formed by the first reflection unit and the first light-input portion is an acute angle.

4. The head mounted display of claim 1, further comprising:
    a second reflection unit, wherein the light guide plate has a second light-input portion optically coupled to the second reflection unit, the first light-output portion and the second light-output portion are respectively disposed on opposite sides of the second light-input portion, and a distance between the second reflection unit and the second light-input portion increases along the direction from the second light-input portion towards the second light-output portion.

5. The head mounted display of claim 4, wherein an angle formed by the second reflection unit and the second light-input portion is an acute angle.

6. The head mounted display of claim 1, wherein the digital micro-mirror device provides a plurality of reflected patterns in a time sequence.

7. The head mounted display of claim 6, wherein switching between the first light source and the second light source is synchronized with switching between the reflected patterns.

8. The head mounted display of claim 1 further comprising a ball lens group disposed between the tapered rod groups and the first reflection prism.

* * * * *